US006152286A

United States Patent [19]
Pienta

[11] Patent Number: 6,152,286
[45] Date of Patent: Nov. 28, 2000

[54] ROLL SEPARATION ASSEMBLY

[75] Inventor: David J. Pienta, Lambertville, Mich.

[73] Assignee: Automatic Handling, Inc., Erie, Mich.

[21] Appl. No.: 09/255,249

[22] Filed: Feb. 22, 1999

Related U.S. Application Data

[63] Continuation-in-part of application No. 09/057,745, Apr. 9, 1998, abandoned.

[51] Int. Cl.[7] .................................................. B65G 47/26
[52] U.S. Cl. .................................... 198/459.6; 198/459.1; 198/463.3; 198/592
[58] Field of Search .............................. 198/418.7, 418.8, 198/459.1, 459.5, 463.3, 589, 592, 861.5, 407, 409

[56] References Cited

U.S. PATENT DOCUMENTS

| 3,182,785 | 5/1965 | Tourtellotte . |
|---|---|---|
| 3,209,890 | 10/1965 | Miles . |
| 3,618,741 | 11/1971 | Beradt . |
| 3,700,090 | 10/1972 | Pearson . |
| 3,866,740 | 2/1975 | Greathead . |
| 4,047,625 | 9/1977 | Grant . |
| 5,341,911 | 8/1994 | Gamberini et al. . |

*Primary Examiner*—James R. Bidwell
*Attorney, Agent, or Firm*—Emch, Schaffer, Schaub & Porcello, Co., L.P.A.

[57] ABSTRACT

A roll separation assembly for separating adjacent rolls on conveyors carrying roll workpieces is disclosed. The roll separation assembly includes first and second conveyors for receiving a plurality of roll workpieces positioned adjacent to one another. An elevator angularly positions one of the conveyors relative to the other conveyor, thereby providing a separation space between adjacent rolls.

17 Claims, 7 Drawing Sheets

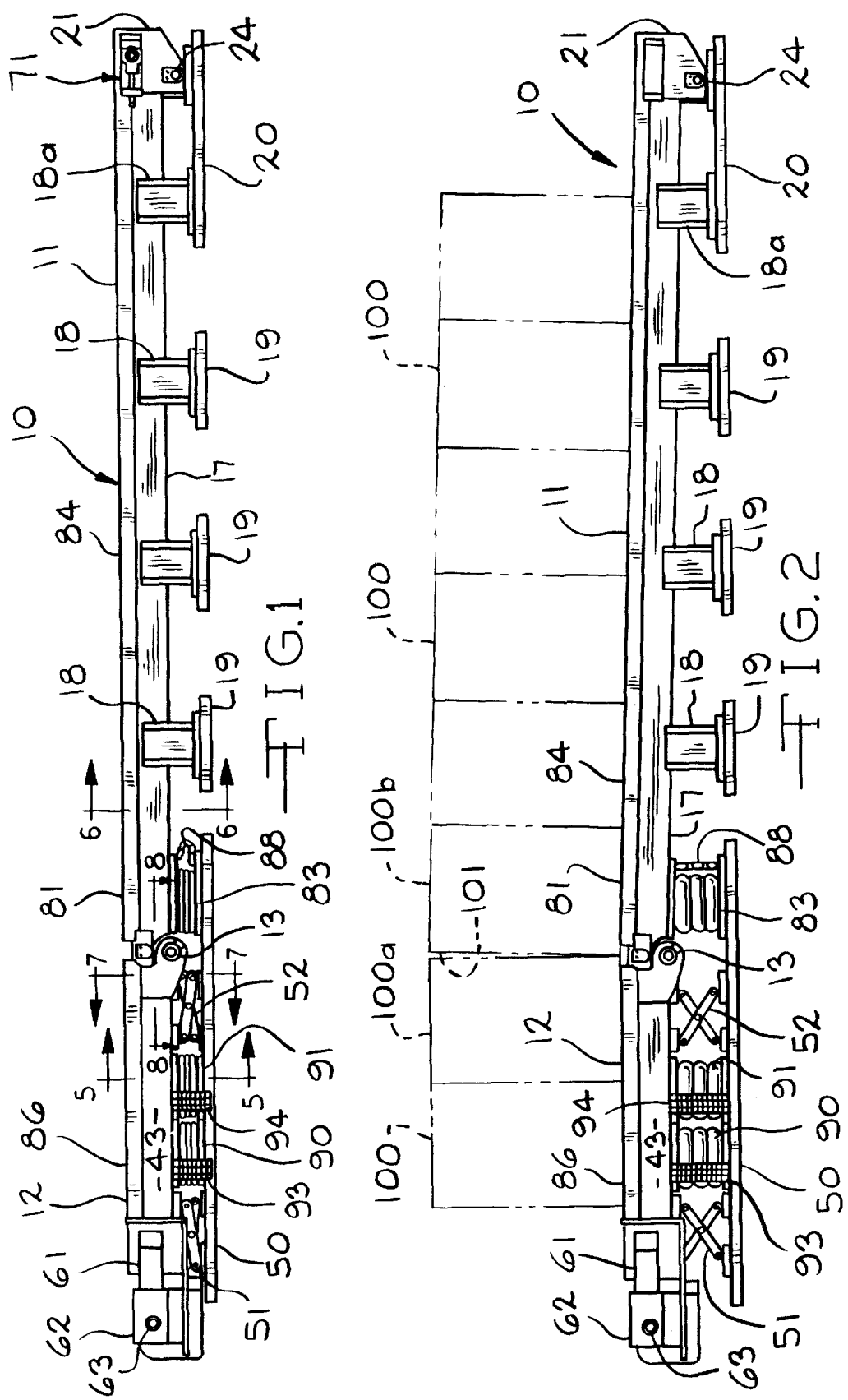

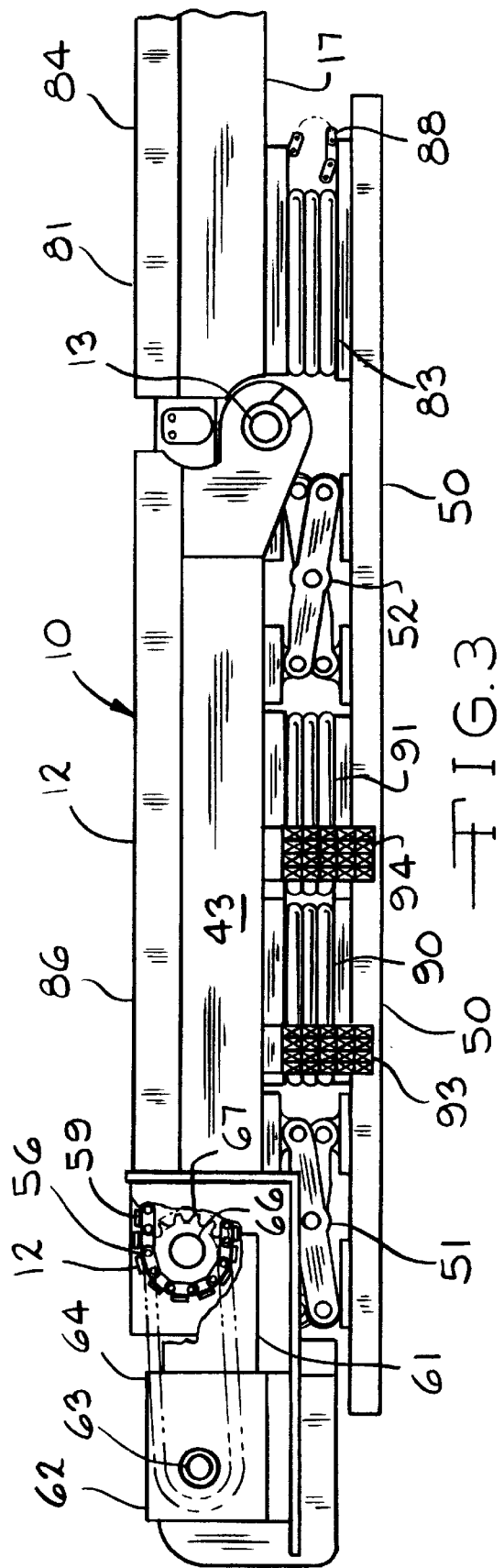

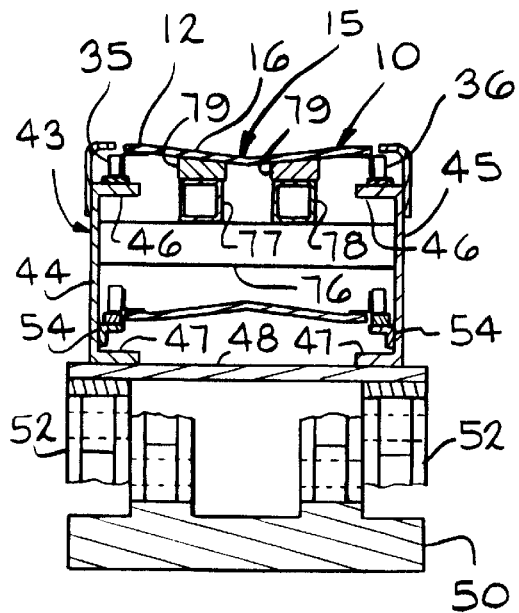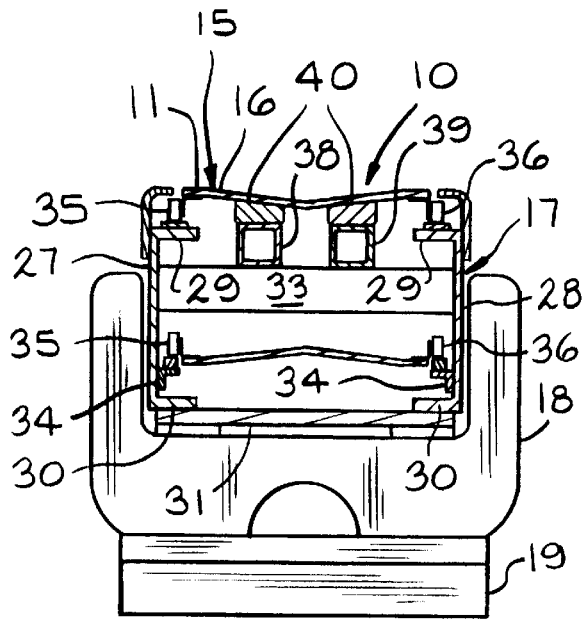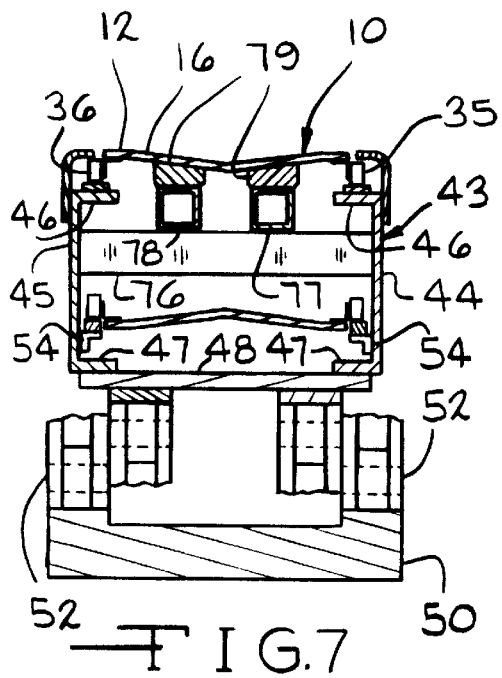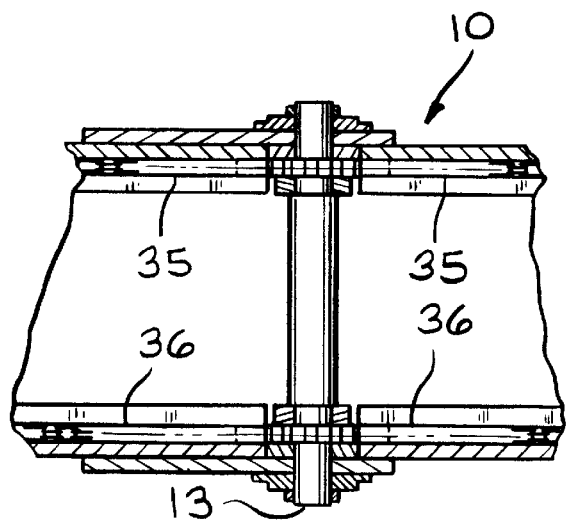

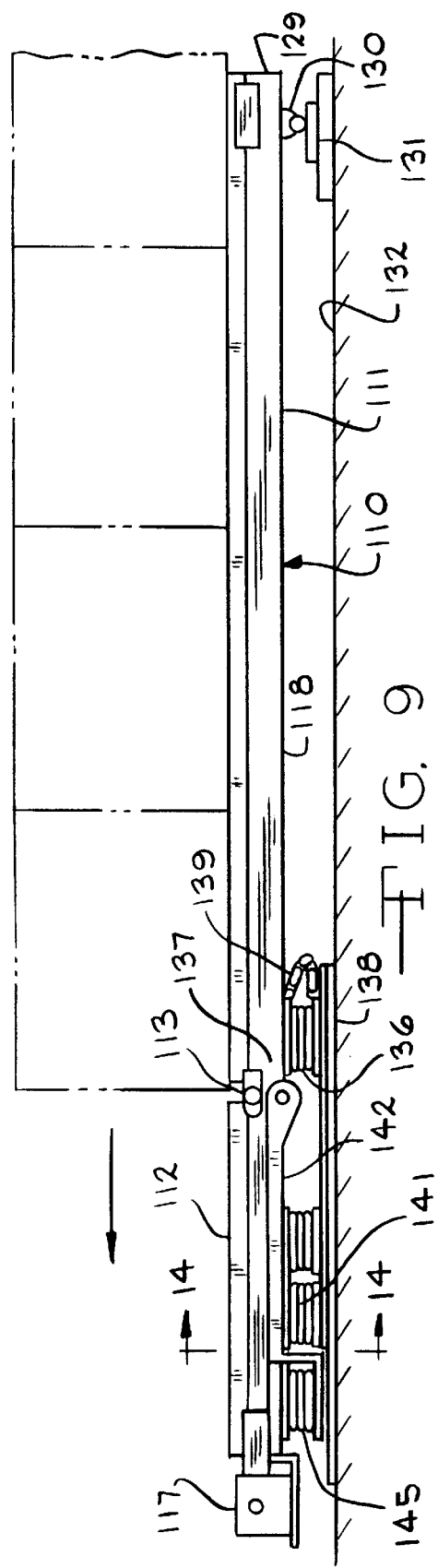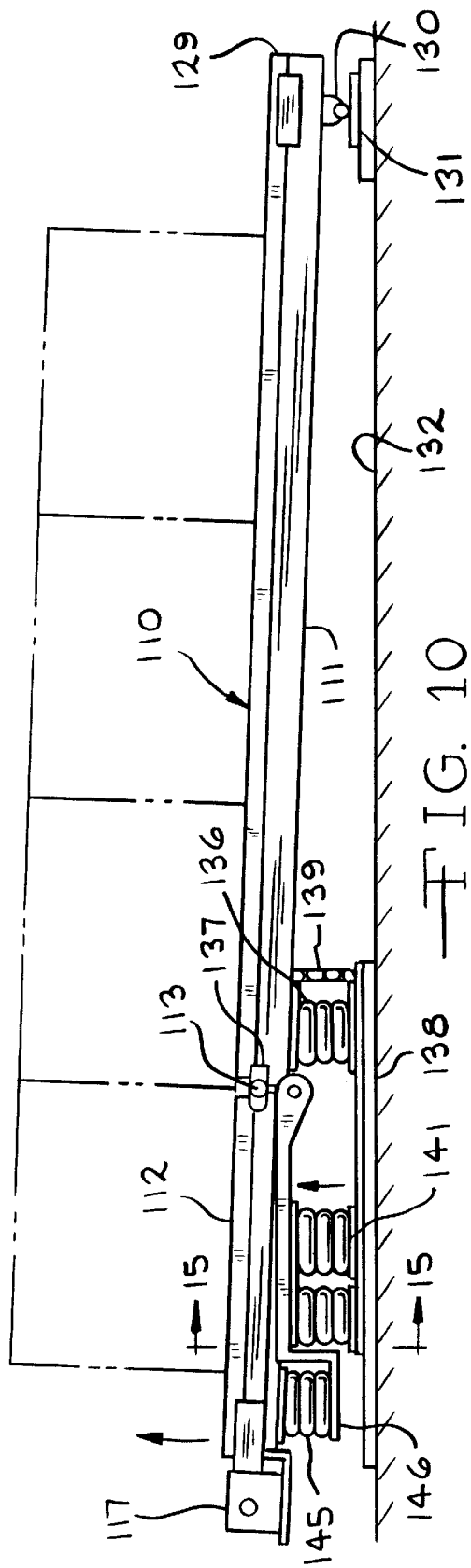

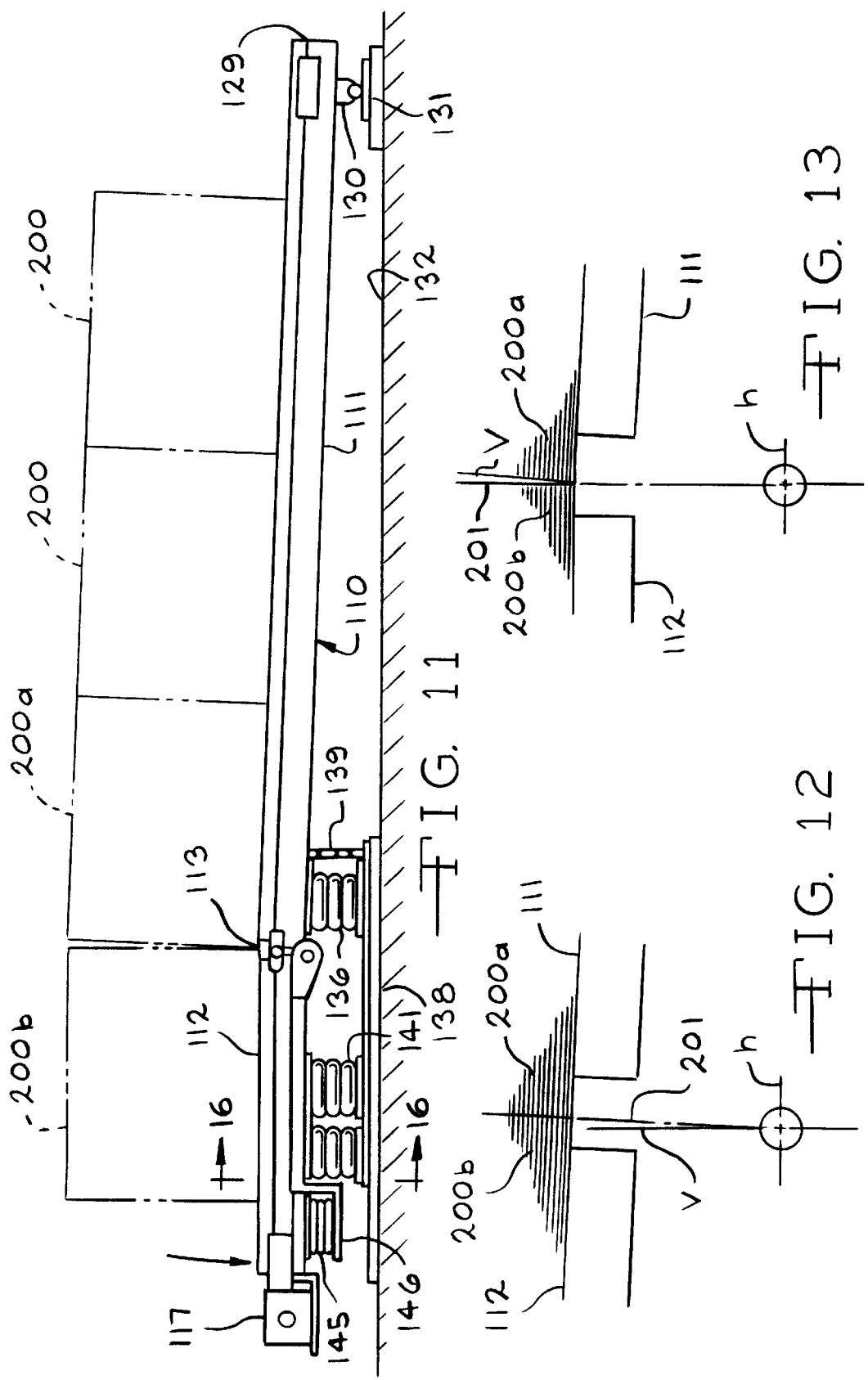

ROLL SEPARATION ASSEMBLY

RELATED APPLICATIONS

The present application is a continuation-in-part application of Ser. No. 09/057,745 filed Apr. 9, 1998 now abandoned.

BACKGROUND OF THE INVENTION

The present invention is directed to a roll separation assembly for separating adjacent rolls on a conveyor line carrying serially positioned roll workpieces. Often, large rolls of paper and other materials, such as films or metals are placed on conveyors where the roll workpieces are positioned closely adjacent to one another. It is not unusual to have rolls weighing in excess of 2600 pounds (1180 kilograms) and having diameters between 24 inches and 72 inches (0.61 m. to 1.83 m.).

When the rolls reach a desired workstation, it is necessary to move predetermined ones of the rolls transversely off the conveyor. The close proximity of serially positioned rolls often make them difficult to move transversely. Accordingly, they must be separated prior to such movement.

In the prior art, a common method of separation is a manual separation. An operator manually separates the rolls and with the use of a ramp, moves the desired rolls transversely. As the rolls become larger in width the manual manipulation of the rolls becomes inefficient.

The prior art has attempted to solve the problem by providing aligned first and second conveyors, where the serially positioned adjacent rolls are moved along one conveyor and then deposited on the second conveyor. In an attempt to achieve roll separation, the second conveyor is moved at an increased speed relative to the speed of the first conveyor. However, it has been found that such a separation method often results in the tearing or damaging of the rolls as they are moved between the first and second conveyors.

The primary object of the present invention is to provide an improved roll separation assembly, for separating serially positioned rolls on a conveyor line.

SUMMARY OF THE INVENTION

The present invention is directed to a roll separation assembly including a first longitudinally extending conveyor having an upper surface for receiving a plurality of roll workpieces. The roll workpieces are serially positioned adjacent one another. A second longitudinally extending conveyor has an upper surface for receiving the roll workpieces from the first conveyor. An elevator is provided for angularly positioning one of the conveyors relative to the other conveyor. In a first embodiment, the other conveyor is provided with a leveling mechanism for maintaining its upper surface in a horizontal plane as the conveyor is vertically moved.

The angular positioning results in a separation space between the adjacent roll workpieces positioned at the adjoining ends of the two conveyors.

In a second embodiment, the first and second aligned conveyors are angularly positioned from a lower horizontal position.

The upper surfaces of the two conveyors lie in a single plane after being moved from the lower horizontal position to the angular position. The other conveyor is then rotated downwardly to a horizontal position.

This again results in a separation space between the adjacent roll workpieces.

DETAILED DESCRIPTION OF THE DRAWINGS

FIG. 1 is an elevational view of a first embodiment of a roll separation assembly, according to the present invention, showing the assembly in its lowered position;

FIG. 2 is an elevational view, similar to FIG. 1, showing the first embodiment of the assembly in its elevated position and indicating in dashed lines a plurality of workpieces positioned on the conveyors;

FIG. 3 is a fragmentary elevational view, showing a portion of the FIG. 1 roll separation assembly of the first embodiment on an enlarged scale;

FIG. 5 is a cross-sectional view, shown on an enlarged scale, taken along the line 5—5 of FIG. 1;

FIG. 6 is a cross-sectional view, similar to FIG. 5, taken along the line 6—6 of FIG. 1;

FIG. 7 is a cross-sectional view, similar to FIG. 5, taken along the line 7—7 of FIG. 1;

FIG. 8 is a fragmentary cross-sectional view, shown on an enlarged scale, taken along the line 8—8 of FIG. 1;

FIG. 9 is an elevational view of a second embodiment of a roll separation assembly according to the present invention, showing the assembly in its lowered position;

FIG. 10 is an elevational view, similar to FIG. 9, showing the second embodiment of the assembly in a raised or angular position;

FIG. 11 is an elevational view, similar to FIG. 9, showing the second embodiment of the assembly where one of the conveyors has been rotated downwardly to a generally horizontal position;

FIG. 12 is a diagrammatic view showing abutting roll workpieces prior to separation;

FIG. 13 is a diagrammatic view similar to FIG. 12 showing the abutting roll workpieces after the roll workpieces are separated;

DETAILED DESCRIPTION OF THE PREFERRED EMBODIMENTS

Figure 4:
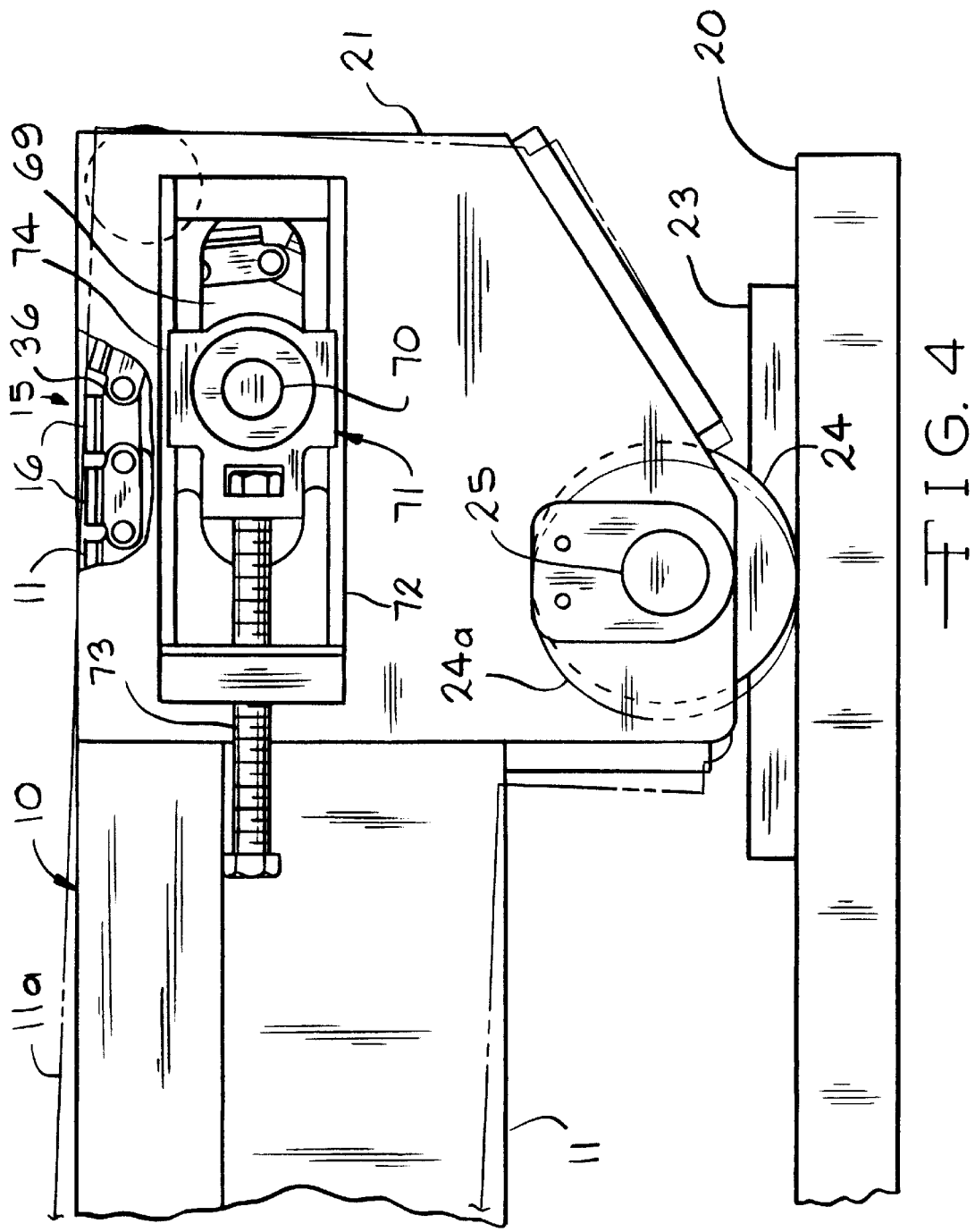
FIG. 4 is a fragmentary elevational view, of an end portion of the first embodiment of the roll separation assembly, shown in FIG. 1, on an enlarged scale.

A first embodiment of a roll separation assembly, according to the present invention is generally indicated in the drawings by the reference number 10. The roll separation assembly 10 includes a first longitudinally extending conveyor 11. In the present embodiment, a second longitudinally extending conveyor 12 is pivotally connected by a pivot roller 13 to the first conveyor 11.

Referring to FIGS. 4, 5 and 6, the first conveyor 11 includes a continuous conveyor member 15 comprising a series of individual conveyor members 16, as best shown in FIG. 4. The first conveyor 11 includes a longitudinally extending base 17 which is supported by a plurality of U-shaped stands 18. The stands 18 are mounted on floor plates 19. The longitudinally extending base 17 includes opposed side walls 27 and 28 having upper ends 29 and lower ends 30 connected to a bottom member 31. The bottom member 31 is supported by the U-shaped stands 18.

Referring to FIGS. 1 and 4, an elongated floor plate 20 mounts the end U-shaped stand 18a and an end portion 21 of the first conveyor 11. Referring to FIG. 4, a guide plate 23 is centrally mounted on the elongated floor plate 20. The end portion 21 mounts a pair of spaced wheels 24. When the first conveyor 11 pivots upwardly to a position 11a the spaced wheels 24 are guided along the longitudinal axis of the conveyor 11, while transverse movement of the wheels 24 is resisted by the guide plate 23.

Cross members 33 extend between opposed side walls 27 and 28. In the present embodiment, opposed angles 34 are mounted on the interior of the opposed side walls 27 and 28. The upper ends 29 of the opposed sidewalls 27 and 28 and the angles 34 mount a pair of continuous chains 35 and 36. Respective ones of the links of the continuous chains 35 and 36 are operatively connected to the ends of the conveyor members 16.

Referring to FIG. 6, in the present embodiment, longitudinally extending rectangular tubes 38 and 39 are mounted on the cross members 33. The support tubes 38 and 39 mount support skids 40. As is well known in the art, the skids 40 and support tubes 38 and 39 help to carry the loads placed upon the conveyors such as the first conveyor 11.

Referring to FIG. 1, the second conveyor 12 includes a base 43 having opposed U-shaped side walls 44 and 45. The side walls 44 and 45 include upper ends 46 and lower ends 47, which are connected to a bottom member 48. An elongated floor plate 50 mounts a pair of spaced leveling mechanisms. In the present embodiment, the leveling mechanisms comprise lazy tong assemblies 51 and 52. As best shown in FIGS. 5 and 7, the lazy tong assemblies 51 and 52 are mounted by the bottom member 50 of the base 43. Opposed angles 54 are mounted on the interior sides of the opposed side walls 44 and 45. As shown in FIGS. 5 and 7, the continuous chains 35 and 36 are supported by respective ones of the upper ends 46 of the opposed angles 54.

Referring to FIG. 3, a motor 61 and reducer 62 have an output shaft 63 which is connected by a drive chain 64 to a driven cross shaft 66. The shaft 66 mounts opposed drive sprockets 67. The drive sprockets 67 mount the continuous chains 35 and 36. The chains 35 and 36 also extend over idler sprockets 69 mounted on a shaft 70 (See FIG. 4). The shaft 70 is a part of a take-up assembly 71 on the end assembly 21, which is used to adjust the tension of the continuous chains 35 and 36. The take-up assembly 71 includes fixed guides 72 which are mounted on opposed sides of the end assembly 21. Adjustable screws 73 are threadably connected to the fixed guides 72 and are connected to moveable heads 74. The opposed moveable heads 74 mount the shaft 70. The screws 73 are rotated to adjust the tension of the opposed continuous chains 35 and 36.

The base 43 of the second conveyor 12 also includes cross members 76 between the sidewalls 44 and 45 which mount longitudinally extending support tubes 77 and 78. Support skids 79 are mounted on the upper sides of the support tubes 77 and 78.

Referring to FIGS. 1–3, an elevator is provided adjacent an end 81 of the first conveyor 11 adjacent the second conveyor 12. In the first embodiment, the elevator comprises an air cushion cylinder 83 moveable between a lowered position shown in FIGS. 1 and 3 and an upper or elevated position shown in FIG. 2. When the air cushion cylinder 83 is activated and raised to the upper FIG. 2 position, an upper surface 84 of the first conveyor 11 assumes an angular relationship with the upper surface 86 of the second conveyor 12.

When the first conveyor 11 is moved from the lowered position in FIGS. 1 and 3 to the raised position in FIG. 2, the end assembly 21 pivots to the position 11a, shown in FIG. 4. The wheels 24 shift to the left to the wheel positions 24a. Preferably, a safety chain 88 is provided adjacent the air cushion cylinder 83 between the conveyor base 17 and the elongated floor plate 50.

Other types of elevators, including other types of cylinders such as hydraulic cylinders and pneumatic cylinders may be used as alternatives to the preferred air cushion cylinders 83.

In the first embodiment, the second conveyor 12 is pivoted relative to the first conveyor 11. A second elevator is provided for the second conveyor 12, moving the upper surface 86 of the second conveyor 12 between a lowered position shown in FIGS. 1 and 3 and an upper or raised position shown in FIG. 2. In the preferred embodiment, shown in FIGS. 1–3, the second conveyor elevator comprises a pair of cushion air cylinders 90 and 91. The cushion air cylinders 90 and 91 extend between the elongated floor plate 50 and the base 43 of the second conveyor 12. Safety chains 93 and 94 extend between the elongated floor plate 50 and the base 43. As the cushion air cylinders 90 and 91 are activated moving the upper surface 86 of the second conveyor 12 between a lowered position shown in FIGS. 1 and 3 and a raised position shown in FIG. 2, the lazy tong assemblies 51 and 52 keep the upper surface 86 horizontal.

In a typical operation of the first embodiment of the roll separation assembly 10, according to the present invention, a plurality of roll workpieces are positioned on the upper surface 84 of the first conveyor 11. The rolls, such as paper rolls are serially positioned closely adjacent to one another, normally touching one another. A plurality of roll workpieces are indicated by the reference number 100 in FIG. 2. The motor 61 is activated and the continuous chains 35 and 36 drive the conveyor member sections 16 thereby moving the roll workpieces 100 along the upper surfaces 84 and 86 of the first conveyor 11 and second conveyor 12. The first and second conveyors 11 and 12 are stopped at a predetermined position to separate roll workpiece 100a and roll workpiece 100b (See FIG. 2). At this time, the cushion air cylinder 83 is activated pivoting the upper surface 84 of the first conveyor 11 upwardly. At the same time, the cushion air cylinders 90 and 91 are also activated and the upper surface 86 of the second conveyor 12 moves horizontally upwardly under the influence of the lazy tong assemblies 51 and 52. A separation 101 occurs between the designated roll workpieces 100a and 100b. In one typical operation an electronic signal passes through the separation 101 and signals through a microprocessor (not shown) the start of a desired automatic transfer of workpieces 100.

In an alternative operation, the separation 101 allows the desired workpieces 100 to be transferred laterally to another work station.

It has been found that when the roll workpieces have large diameters compared to their lengths, a second embodiment is preferable to reduce the risk of edge scuffing.

The second embodiment of a roll separation assembly, according to the present invention is generally indicated in FIGS. 9–16 of the drawings by the reference number 110. The second embodiment of the roll separation assembly 110 includes a first longitudinally extending conveyor 111 and a second longitudinally extending conveyor 112. In this embodiment, the conveyor 112 is pivotally connected by a pivot roller 113 to the first conveyor 111. Each of the first conveyor 111 and second conveyor 112 includes a series of continuous conveyor members 115 which are operatively driven by a common motor and gear reduction unit 117.

Similar to the first embodiment of the roll separation assembly 10, the conveyors 111 and 112 include a longitudinally extending base 118 having side walls 119 and 120. The upper ends of the side walls 118 and 119 mount a pair of continuous chains 122 and 123 which in turn are operatively connected to the conveyor members 115.

Figure 14:
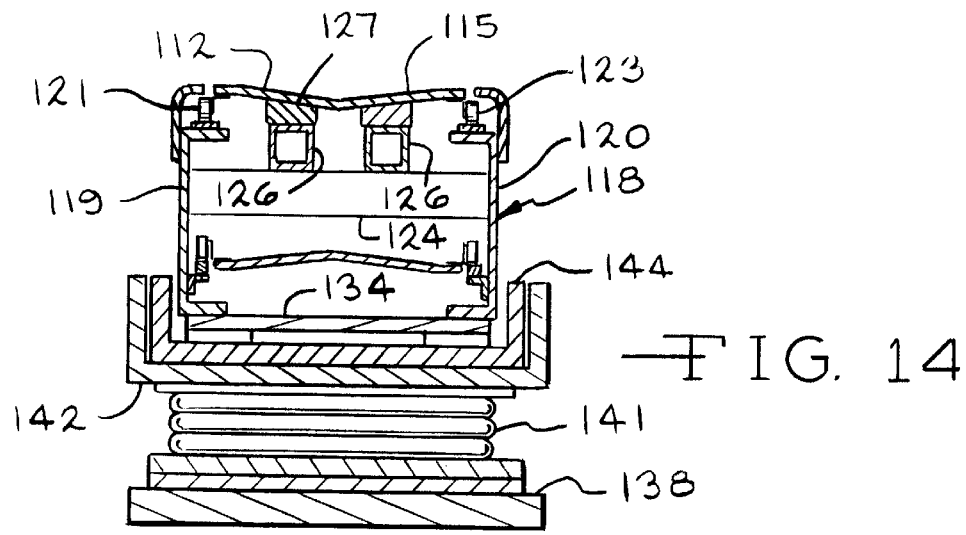
FIG. 14 is a cross-sectional view, shown on an enlarged scale, taken along the line 14—14 of FIG. 9.
Figure 15:
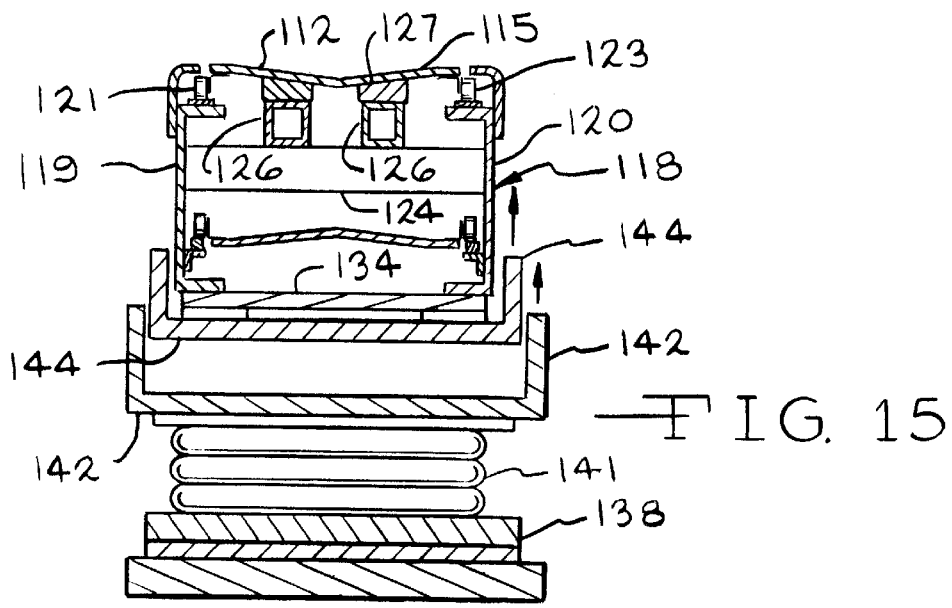
FIG. 15 is a cross-sectional view, shown on an enlarged scale, taken along the line 15—15 of FIG. 10.
Figure 16:
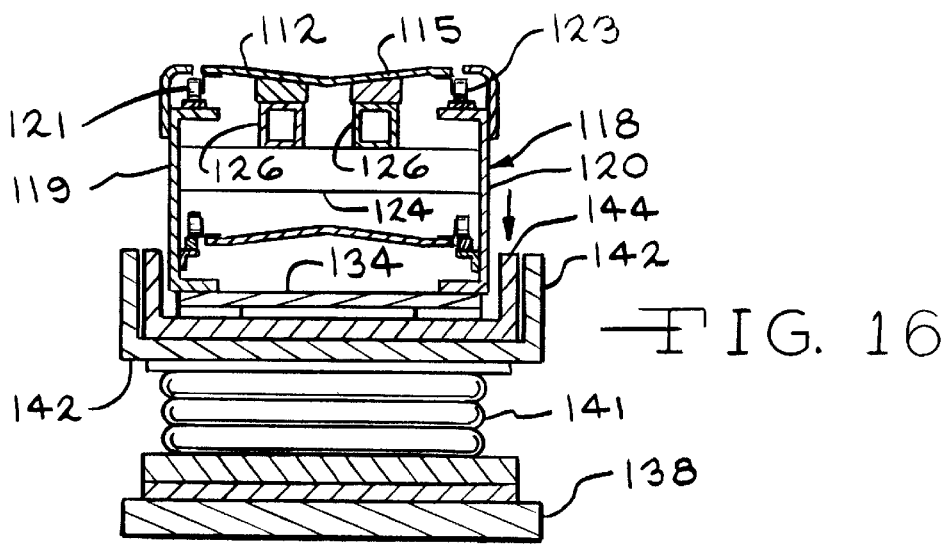
FIG. 16 is a cross-sectional view, shown on an enlarged scale, taken along the line 16—16 of FIG. 11.

Cross members 124 extend between the side walls 119 and 120 of the base 118 and skids 127 are mounted on tubes 126. The tubes 126 and skids 127 provide support for the conveyor members 115 as they are moved by the continuous chains 121 and 122. Referring to FIGS. 14–16, the side walls 118 and 119 are joined together by bottom plates 134.

In the second embodiment of the roll separation assembly 110, an end 129 of the base 118 is supported by a transverse roll assembly 130. The transverse roll assembly 130 is mounted for movement on a bearing assembly 131 which is positioned on a floor or other support 132.

Referring to FIGS. 9–11, in the second embodiment of the roll separator assembly 110, the first conveyor 111 has an elevator 136 positioned adjacent its end 137. The elevator 136, in the present embodiment, comprises cushion air cylinder and is mounted on a longitudinally extending support 138. A safety chain 139 extends between the first conveyor 111 and the support 138.

The elevator 136 rotates the first conveyor 111 upwardly into the angled position, as shown in FIGS. 10 and 11. During this movement, the transverse roll assembly 130 is free to slide on the bearing assembly 131.

Referring to FIGS. 9, 10 and 11, a second elevator 141 is positioned beneath the second conveyor 112. The second elevator 141, in the present embodiment, comprises a pair of cushion air cylinders mounted on the longitudinal extending support 138 and extending upwardly to a generally horizonal frame 142. In the present embodiment, the frame 142 has a U-shaped cross-section. A supplemental frame 144, also having a generally U-shaped cross-section, is mounted within the frame 142 and mounts the conveyor bottom plate 134. A supplemental elevator 145 is positioned to move the supplemental frame 144 relative to the main frame 142. Again, the supplemental elevator 145 in the present embodiment comprises a cushion air cylinder. In the second embodiment of the roll separator 110, as shown in FIGS. 9–11, the supplemental elevator 145 is mounted on an L-shaped support 146 connected to the frame 142.

Referring to FIG. 9, when the second elevator 141 is in its lowered position and the supplemental elevator 145 is in its lowered position, the upper surface of the second conveyor 112 is horizontal and provides a continuous horizontal surface with the upper surface of the first conveyor 112. At that time, the upper surfaces lie in the same horizontal plane. When the cushion air cylinders, comprising the second elevator 141, are activated and the supplemental elevator, comprising a cushion air cylinder is activated, the second conveyor 112 is angularly moved or pivoted upwardly at the same time the elevator 136 is pivotally moving the first conveyor 111 upwardly. When in the FIG. 10 elevated position, the upper surfaces of the first and second conveyors 111 and 112 remain in an overall angular position and plane.

When the supplemental elevator 145 is lowered, the desired separation of the workpiece rolls takes place as the supplemental frame 144 moves downwardly relative to the frame 142. The upper surface of the second conveyor 112 moves to a generally horizontal position, as shown in FIG. 11.

FIG. 12 is a diagrammatical view showing the lower edges of a pair of adjacent roll workpieces 200*a* and 200*b* when using the second embodiment of the roll separation assembly 110. The joining line of the rolls 200*a* and 200*b* is indicated by the dashed line 201. The upper surfaces of the first conveyor 111 and second conveyor 112 have been rotated upwardly to a position where the upper surface of the conveyors 111 and 112 are angularly positioned to a horizontal reference line H. The vertical reference line V forms an angle with the line 201. When the supplemental elevator 145 is deflated, the second conveyor 112 is pivoted downwardly toward a horizontal position. By this action, the line 201 is shifted to the opposite side of the vertical reference line V and the rolls 200*a* and 200*b* have separated without damaging their lower edges.

In a typical operation of a roll separation assembly 110, according to the present invention, a plurality of roll workpieces 200 are positioned on the upper surface of the first conveyor 111, as shown in FIG. 9. The rolls, such as paper rolls are serially positioned closely adjacent to one another, normally touching one another. The motor-gear reducer unit 117 is activated and the continuous chains 121 and 122 drive the conveyor members 115 moving the roll workpieces 200.

The first and second conveyors 111 and 112 are stopped at a predetermined position (see FIG. 10) in order to separate the roll workpieces 200. At this time, the cushion air cylinders which comprise the first elevator 136, the second elevator 141 and the supplemental elevator 145 have all been inflated to their elevated position. This action has placed the upper surfaces of the first conveyor 111 and the second conveyor 112 in a longitudinally extending angular position having a continuous upper surface, as shown in FIG. 10. Next, the supplemental elevator 145 is lowered moving the supplemental frame 144 to its lowered position, as shown in FIGS. 11 and 16. This results in the separation of the workpiece rolls 200*a* and 200*b*, as indicated diagrammatically in FIG. 13. The separated workpieces may then be moved either by an automatic or manual transfer to another workstation or location.

Many revisions may be made to the above described preferred embodiments without departing from the scope of the present invention or from the following claims.

I claim:

1. A roll separation assembly, comprising a first longitudinally extending conveyor having an upper surface for receiving a plurality of roll workpieces positioned adjacent one another, a second longitudinally extending conveyor having an upper surface for receiving roll workpieces from said first conveyor, an elevator for angularly positioning one of said first and second conveyors relative to the other one of said first and second conveyors wherein a separation space occurs between a first roll workpiece positioned on said first conveyor and a second roll workpiece positioned on said second conveyor, said first and second roll workpieces being adjacent one another, and a wheel assembly mounted at one end of one of said first and second conveyors, said wheel assembly including wheels.

2. A roll separation assembly, according to claim 1, said first and second conveyors including movable conveyor members for supporting said roll workpieces.

3. A roll separation assembly, according to claim 2, including a chain operatively connected to said conveyor members.

4. A roll separation assembly, according to claim 1, said first conveyor including a continuous conveyor member, a base mounting said continuous conveyor member and a plurality of stands defining upper openings for receiving and supporting said base.

5. A roll separation assembly, according to claim 3, including a drive motor operatively connected to said chain.

6. A roll separation assembly, according to claim 1, wherein said elevator comprises at least one cylinder operatively connected to said first conveyor for angularly positioning said first conveyor relative to said second conveyor.

7. A roll separation assembly, according to claim 6, including a second elevator operatively connected to said second conveyor, said second elevator comprising at least one cylinder for raising and lowering said second conveyor.

8. A roll separation assembly, according to claim 6, wherein said first conveyor is pivotally connected to said second conveyor and said cylinders are cushion air cylinders.

9. A roll separation assembly, comprising first and second longitudinally extending upper surfaces for receiving a plurality of roll workpieces positioned adjacent to one another, an elevator for angularly positioning one of said first and second conveyors relative to the other one of said first and second conveyors, wherein a separation space occurs between a first roll workpiece positioned on said first conveyor and an adjacent second roll workpiece positioned on said second conveyor and a leveling mechanism below the other one of said first and second conveyors for maintaining said other one of said first and second conveyors in a horizontal position when vertically moved.

10. A roll separation assembly, according to claim 9, wherein said first and second conveyors are pivotally connected to one another.

11. A roll separation assembly, comprising a first longitudinally extending conveyor having an upper surface for receiving a plurality of roll workpieces positioned adjacent one another, a second longitudinally extending conveyor having an upper surface for receiving roll workpieces from said first conveyor, an elevator for angularly positioning one of said first and second conveyors relative to the other one of said first and second conveyors wherein a separation space occurs between a first roll workpiece positioned on said first conveyor and a second roll workpiece positioned on said second conveyor, said first and second roll workpieces being adjacent one another, said elevator comprising at least one cylinder operatively connected to said first conveyor for angularly positioning said first conveyor relative to said second conveyor and a second elevator operatively connected to said second conveyor, said second elevator comprising at least one cylinder or raising and lowering said second conveyor.

12. A roll separation assembly, according to claim 11, wherein said second elevator maintains the upper surface of said second conveyor in a generally horizontal position throughout travel.

13. A roll separation assembly, according to claim 11, wherein said second elevator raises said second conveyor angularly, positioning the upper surface of said second conveyor in an angular position in alignment with the raised angular position of the first conveyor.

14. A roll separation assembly, according to claim 13, wherein said second conveyor includes a second supplemental elevator for lowering the upper surface of said second conveyor while the upper surface of said first conveyor remains in an angled position.

15. A roll separation assembly, according to claim 11, including a leveling mechanism mounted on said second conveyor for maintaining an upper surface of said second conveyor level during operation of said elevator.

16. A roll separation assembly, according to claim 15, wherein said leveling mechanism comprises a pair of spaced lazy tong assemblies.

17. A roll separation assembly, comprising a first longitudinally extending conveyor having an upper surface for receiving a plurality of roll workpieces positioned adjacent one another, a second longitudinally extending conveyor having an upper surface for receiving roll workpieces from said first conveyor, an elevator for angularly positioning one of said first and second conveyors relative to the other one of said first and second conveyors wherein a separation space occurs between a first roll workpiece positioned on said first conveyor and a second roll workpiece positioned on said second conveyor, said first and second roll workpieces being adjacent one another, said elevator comprising at least one cylinder operatively connected to said first conveyor for angularly positioning said first conveyor relative to said second conveyor, said first conveyor being pivotally connected to said second conveyor and said cylinders comprise cushion air cylinders.

\* \* \* \* \*